Figure 1:
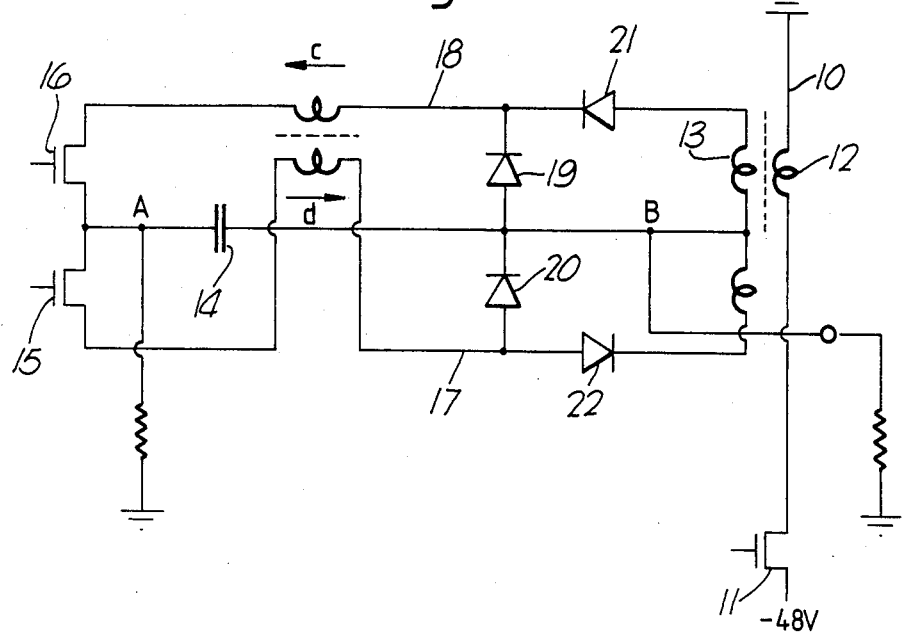

United States Patent [19]

Robson et al.

[11] Patent Number: 4,737,989
[45] Date of Patent: Apr. 12, 1988

[54] RINGING CIRCUIT

[75] Inventors: Michael A. C. Robson, Rugby; Peter A. Cross, Coventry, both of England

[73] Assignee: The General Electric Company, p.l.c., England

[21] Appl. No.: 24,001

[22] Filed: Mar. 10, 1987

[30] Foreign Application Priority Data

Mar. 12, 1986 [GB] United Kingdom ............... 8606151

[51] Int. Cl.$^4$ .............................................. H04M 3/02
[52] U.S. Cl. .................................................. 379/418
[58] Field of Search ....................... 379/418, 179, 252

[56] References Cited

U.S. PATENT DOCUMENTS 3,904,833  9/1975  Beene .................................. 379/418
4,354,062 10/1982  Mussman .

FOREIGN PATENT DOCUMENTS 0075914  4/1983  European Pat. Off. .
0136077  4/1985  European Pat. Off. .
60-178760  9/1985  Japan .

Primary Examiner—Stafford D. Schreyer
Attorney, Agent, or Firm—Kirschstein, Kirschstein, Ottinger & Israel

[57]  ABSTRACT

The invention concerns an electronic ringing circuit for telephone systems. A capacitor is connected to the center tapping of a first coil inductively coupled to a transistor-controlled supply line. The other side of the capacitor is connected to the junction between two switches each switch being connected via an induction coil to one end of the first coil so that when the switches are switched in opposite senses load current is drawn in alternate directions from the capacitor.

5 Claims, 2 Drawing Sheets

RINGING CIRCUIT

The present invention concerns a circuit for use in telephone systems and in particular what is known as a ringing circuit.

A ringing circuit is used to generate the signal which is sent to each subscriber in a telephone network to cause the dialled telephone to ring.

In the past both mechanical rotary generators and electronic arrangements have been used to provide the requisite signals. Rotary generators are bulky, heavy and prone to wear. The prior electronic solution has been to have a pair of large reservoir capacitors between a pair of intermediate rails coupled inductively to a supply line controlled by a transistor. Load current is alternately taken from the capacitors via a pair of MOSFET transistors.

This arrangement has a number of disadvantages. The MOSFET switching transistors cannot be driven with a single earth-referenced waveform. Furthermore the output is not short-circuit proof so current limitation is required to prevent damage to the output stage. Also the MOSFET switching transistors do not directly control the output voltage as an intermediate inductor is required.

The present invention has for an object to reduce the above disadvantages.

Accordingly the present invention consists in a circuit for generating ringing signals for a telephone system and comprising a capacitor one side of which is connected to the centre tapping of a first coil inductively coupled to a transistor-controlled supply line, and the other side of which is connected to the junction between two switches, each switch in turn being connected via an induction coil to one end of said first coil, the arrangement being such that when the switches are switched in opposite senses load current is drawn in alternate directions from the capacitor.

Preferably the two switches are MOSFET transistors.

The circuit arrangement may also include means for sensing the load voltage drawn, and for altering the mark-to-space ratio of the waveform driving the two transistor switches.

Figure 2:
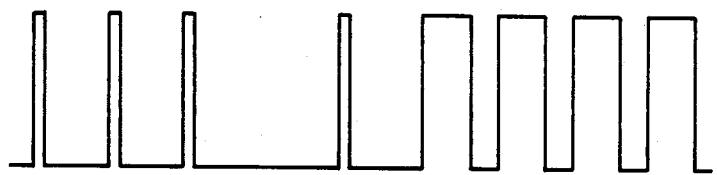
Figure 3:
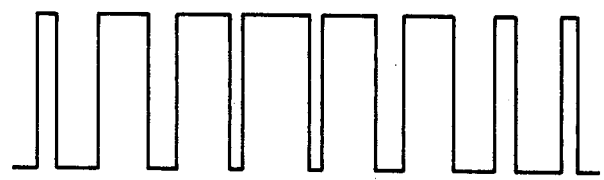
Figure 4:
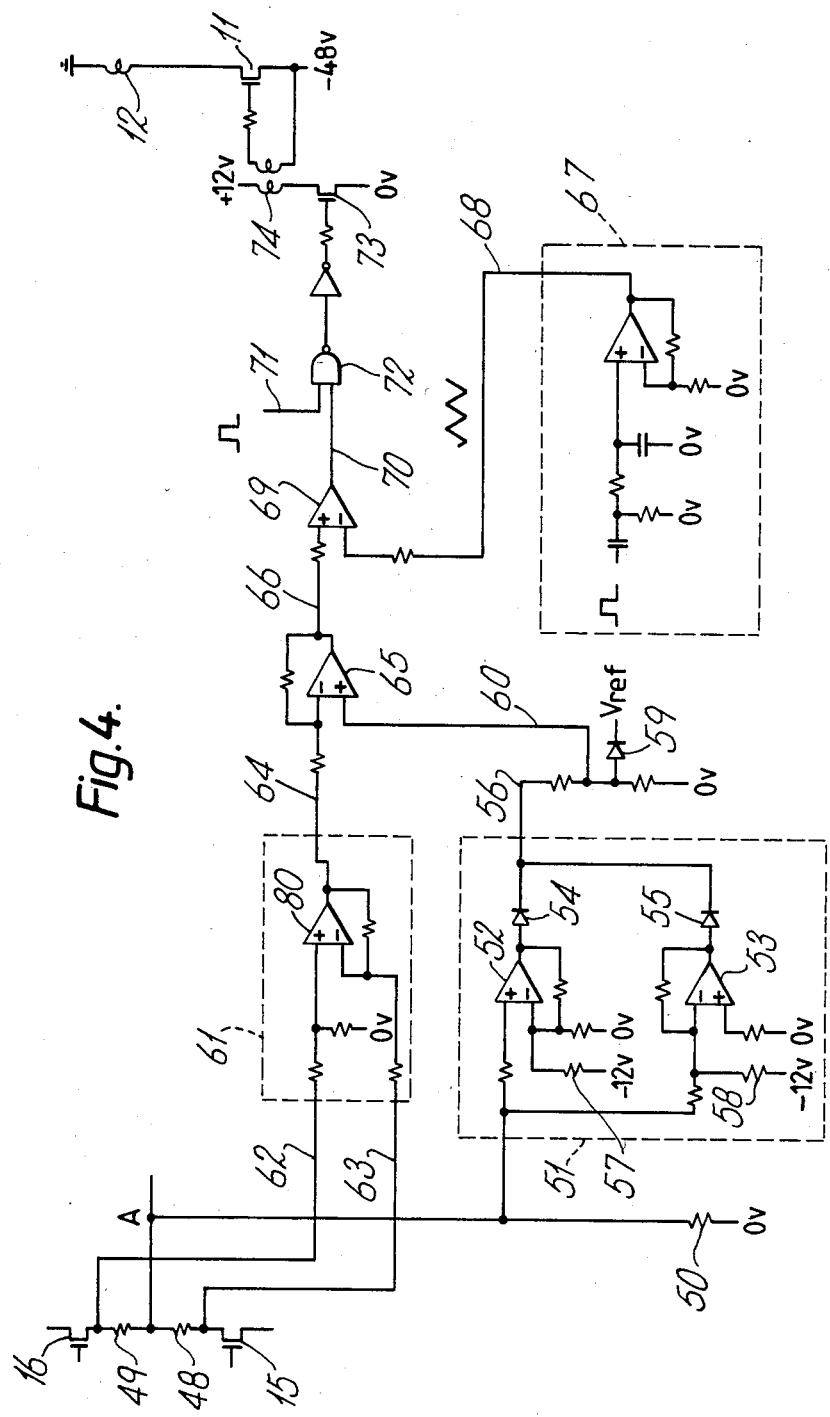

In order that the present invention may be more readily understood an embodiment thereof will now be described by way of example and with reference to the accompanying drawings, in which:

FIG. 1 is a circuit diagram of a ringing circuit for a telephone system and constructed in accordance with the present invention, FIGS. 2 and 3 show drive waveforms generated during the operation of the circuit of FIG. 1, and FIG. 4 is a circuit diagram of a control circuit associated with the circuit of FIG. 1.

Referring now to the drawings, FIG. 1 shows a ringing circuit for a telephone system. The circuit comprises a supply rail 10 extending between earth and a −48 volt DC source. Rail 10 includes a switching transistor 11 and a coil 12. The coil 12 is inductively coupled to a split coil 13 the centre tapping of which is connected to one side of a capacitor 14. The other side of capacitor 14 is connected to the junction between a pair of MOSFET transistors 15 and 16. The transistors 15 and 16 are respectively connected to rails 17 and 18 which in turn are connected to the respective ends of split coil 13. The circuit also includes diodes 19 to 22.

In operation of the circuit a waveform as shown in FIG. 2 is applied to the base of switching transistor 11, and waveforms as shown in FIG. 3 applied to transistors 15 and 16. With regard to the latter pair of transistors the switching waveforms are arranged so that when transistor 15 is conducting, transistor 16 is off and vice-versa. It will be appreciated that when transistor 15 is turned on current will flow from capacitor 14 in the direction shown by arrow d, and when transistor 16 is turned on current will flow in the direction of arrow c.

Load can be drawn from the circuit just described in different ways. If an earth reference output signal is required either of points A or B can be earthed and output taken from the non-earthed point. FIG. 1 shows point A earthed and point B used as an output as this configuration makes transistors 15 and 16 easier to drive. Transistor 16 can be an NPN bipolar or N channel MOSFET, and transistor 15 at PNP bipolar or P channel MOSFET.

The circuit can be used to provide an output of 75 V rms at 24 Hz for ringing current generation. To achieve this transistor 11 is switched at 50 Khz and the transistors 15 and 16 at 25 Khz. The waveform shown in FIG. 2 is based on transistor 11 being a MOSFET. The narrow pulses represent a light output load and the broader output pulses a heavy output load. The change in mark-to-space ratio of this waveform is achieved by sensing the output current I and using negative feedback. For very low outputs it is possible for some of the drive pulses to be omitted. The sensing circuit is shown in FIG. 4.

Referring now to FIG. 4 it will be seen that the figure incorporates part of FIG. 1, namely transistors 15, 16, and resistors 48, 49 and 50 at one end of the ringing circuit, and output transistors 11, 12 at the other end. The output circuit I of the ringing circuit also flows through resistor 50 and this is a convenient place to monitor it. This is done by monitoring the voltage at point A with respect to 0 Volts. Resistor 50 has a low resistance such that it has a negligible voltage contribution to the output voltage.

Since the current is alternating, the voltage at A will be alternating with respect to 0 Volts and can be rectified by a circuit such as 51. Operational amplifier 52 is connected as a non-inverting amplifier and operational amplifier 53 is connected as an inverting amplifier, so that in conjunction with diodes 54 and 55 the voltage at point 56 is always positive with respect to 0 Volts. Resistors 57 and 58 apply a negative bias to the inverting inputs of operational amplifiers 52 and 53 and thus apply a positive offset at point 56. Thus if no output current I is flowing there is a positive offset at point 56. As will be shown later this voltage is used to control the switching transistor 11, so that when zero output current is flowing the capability still exists for transistor 11 to supply current.

The voltage at point 60 is a scaled representation of the voltage at point 56 except that it cannot be set more positive than a voltage set by diode 59 and the voltage $V_{ref}$ to which the diode is connected. $V_{ref}$ is a fixed or pre-set voltage which is set at a suitable value. The purpose of this voltage limiting, as will be shown later, is to set a maximum limit on the switching of transistor 11. It thus acts as a current limit.

As was explained before the current switched from transistor 11 is inductively coupled to rails 17 and 18 and flows in that rail which is permitted by either transistor 15 or transistor 16 being switched on. When transistor 16 is switched on the voltage at point 62 will be positive with respect to point A and the magnitude of this voltage difference will be a representation of the current flowing through transistor 16. Transistor 15 will be in the OFF state and thus no current will be flowing through resistor 48, so there will be no voltage difference between point 63 and point A. Thus the voltage difference between points 62 and 63 is a representation of the current flowing through transistor 16. By similar argument this voltage difference is a representation of the current flowing in transistor 15 when it is in the ON state and transistor 16 is in the OFF state. During the transition period between transistors 15 and 16 alternately conducting it is a requirement that their conducting states should overlap. During this transient state the current being monitored is shared between resistors 48 and 49 and the voltage difference between points 62 and 63 represents the total value of this shared current. Thus this voltage difference represents the current flowing in either or both of rails 17 and 18. It can be seen that this figure is more realistic if resistors 48 and 49 have the same resistance. This voltage difference can be converted to a single ended signal by an operational amplifier 80 connected as in circuit 61. This voltage appears at point 64, and is positive with respect to 0 volts, and represents the current in the constant current source.

Operational amplifier 65 produces an output at point 66 which is proportional to the voltage at point 60 minus the voltage at point 64 provided that suitable resistance values have been used in the circuits which contribute to this voltage.

As was described earlier the voltage at point 60 represents the load current I plus an offset. The voltage at point 64 represents the circulating current in the constant current source. The circulating current consists of the load current plus the current that flows through capacitor 14. If the current through the capacitor is related to the offset described above then it can be seen that the voltage at point 66 corresponds to an error signal in a control loop which is setting the current level in the constant current source at a value which is adequate to supply the load current I plus the capacitor current. If the requirement for increased load current occurs the voltage of the error signal at point 66 becomes more positive and, as will be described, this has the effect of turning transistor 11 on for a longer period of time so that the current in the constant current source can increase to a suitably higher value.

The limiting action of diode 59 has been described earlier. This places a limit on the demand which can be made for increased current to supply the load. If load current increases in excess of this value the additional current is initially supplied only by effecting a reduction of current through capacitor 14. This results in the output voltage reducing since the output voltage is set by capacitor 14 current, the Ringing Circuit produces a current limited output and transistor 11 is maintained within its design limits.

These are the events which occur when the error signal at point 66 becomes more positive. The opposite happens when load current decreases. The error signal becomes more negative, transistor 11 switches on for shorter periods and the current in the constant current source reduces to a lower value.

The error signal may be converted to a signal which is suitable to drive transistor 11 by the use of a pulse width modulator such as will be described.

A triangular waveform can be generated by circuit 67 from a train of square waves at a suitable frequency of, say, 50 kHz. This triangular waveform on rail 68 is compared with the error signal 66 by comparator 69. It is necessary that the comparator output 70 switches between suitable levels to function as logical highs and lows for NAND gate 72. The operation of the modulator 69 is to produce a train of square waves at its output 79 having the same repetition frequency as the triangular waveform but of varying mark-space ratio such that as point 66 becomes more positive then the positive excursions at point 70 occur for longer periods of time and vice versa. Another input 71 to NAND gate 72 may use the waveform of square waves as used in the triangle generator 67 and has the effect of forcing logical lows on the gate of transistor 73. Thus a logical high appearing on rail 70 may only appear for up to 50% of the period at the gate of transistor 73. This feature, called deadtime, is often used in power supplies where pulse transformers are being driven.

Transistor 73, which may be an N-channel MOSFET transistor, is driven ON and OFF by the pulse width modulated waveform described above. It may be connected via transformer 74 to the gate of transistor 11 as a means of voltage isolation. It is usual that circuitry is connected to the drain of transistor 73 to snub the fast rising waveform as it switches OFF and also to permit the transformer magnetising current to decay during the deadtime.

Transformer 74 couples the pulse width modulated signal to the gate of transistor 11. Depending on the power of the Ringing Circuit, transistor 11 may be a high powered device in which case there will be components in the gate circuit. There are various techniques used to drive this type of transistor but this is not within the scope of this description.

The drain of transistor 11 is connected to coil 12. As described for transistor 73 there will be components associated with the drain of transistor 11 concerned with snubbing and with de-fluxing the transformer during the deadtime. This feedback arrangement improves economy in low load situations.

In the circuit described transistor 11 produces a constant current source, whilst transistors 15 and 16 are used to control the polarity and amplitude of the output voltage. It is however possible for transistors 15 and 16 to control polarity only with amplitude controlled by transistor 11, but this is not the preferred arrangement.

The ringing circuit just described has a number of advantages over prior arrangements. In addition to using simple and relatively inexpensive components it is relatively immune to external currents and the output voltage can be controlled in the face of fault currents returned from the load. Whilst the circuit has been described as providing 75 volts rms at 24 Hz, it is of course possible for it to be adapted very easily to meet other standards. Thus the switching frequencies given in the preceding description are merely typical but can be varied in accordance with circumstances.

We claim:

1. A circuit for generating ringing signals for a telephone system comprising:
    (a) a supply rail for connection between earth and a DC voltage source,
    (b) a first coil in said supply rail,
    (c) a second coil inductively coupled to said first coil,
    (d) a capacitor one side of which is connected to a tapping of said second coil, (e) a pair of transistor switches connected in series and, the junction between said pair of transistor switches being connected to the other side of said capacitor, (f) first and second rails each connecting a respective one of said switching transistors to an individual end of said second coil, the arrangement being such that when the switch transistors are switched alternately in opposite senses load current is drawn in alternate directions from said capacitor.

2. A ringing circuit as claimed in claim 1, wherein said first and second rails are inductively coupled to each other.

3. A ringing circuit as claimed in claim 2, wherein said switching transistors are MOSFET transistors.

4. A ringing circuit as claimed in claim 3, wherein said supply rail further includes a switching transistor.

5. A ringing circuit as claimed in claim 1, and further including:
(a) means for sensing the load voltage drawn from the ringing circuit, and
(b) means for altering the mark-to-space ratio of the waveform driving said switch transistors.

* * * * *